(12) United States Patent
Zhang et al.

(10) Patent No.: US 8,347,166 B2
(45) Date of Patent: Jan. 1, 2013

(54) DEVICE AND METHOD FOR OPTIMALLY ADJUSTING TRANSMITTER PARAMETERS

(75) Inventors: Qi Zhang, Shenzhen (CN); Xiao Peng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 165 days.

(21) Appl. No.: 13/062,103

(22) PCT Filed: Sep. 1, 2009

(86) PCT No.: PCT/CN2009/073669
§ 371 (c)(1),
(2), (4) Date: Mar. 3, 2011

(87) PCT Pub. No.: WO2010/025663
PCT Pub. Date: Mar. 11, 2010

(65) Prior Publication Data
US 2011/0161738 A1    Jun. 30, 2011

(30) Foreign Application Priority Data
Sep. 4, 2008 (CN) .......................... 2008 1 0141853

(51) Int. Cl.
H03M 13/00 (2006.01)
H04L 1/18 (2006.01)
G06F 7/02 (2006.01)

(52) U.S. Cl. ........................................ 714/751; 714/821

(58) Field of Classification Search .................. 714/746, 714/751, 821
See application file for complete search history.

(56) References Cited

U.S. PATENT DOCUMENTS

| | | | |
|---|---|---|---|
| 5,564,087 A | 10/1996 | Cygan et al. | |
| 7,058,299 B1 * | 6/2006 | Shah et al. | 398/27 |
| 7,567,788 B2 | 7/2009 | Newton et al. | |
| 2002/0108081 A1 * | 8/2002 | Mitlin et al. | 714/746 |
| 2004/0120300 A1 * | 6/2004 | Saquib | 370/342 |
| 2007/0066242 A1 | 3/2007 | Yi et al. | |
| 2007/0141995 A1 | 6/2007 | Youn et al. | |
| 2008/0002762 A1 | 1/2008 | Cranford et al. | |
| 2008/0159369 A1 | 7/2008 | Cranford et al. | |
| 2008/0274700 A1 | 11/2008 | Li | |

FOREIGN PATENT DOCUMENTS

CN    1162374 A    10/1997
(Continued)

OTHER PUBLICATIONS

Miller, Christopher, High Speed Digital Transmitter Characterization Using Eye Diagram Analysis, Aug. 31, 1994, Hewlett Packard Journal, p. 29 to 37.*
Noe, Reinhold et al., Polarization mode Dispersion Compensation at 10, 20, and 40 Gb/s with Various Optical Equalizers, Sep. 1999, IEEE Journal of Lightwave Tech. vol. 17, No. 9, p. 1602-1616.*
D, Jaksch et al., Cold bosonic atoms in optical lattices, Oct. 12, 1998, Physical Review letters, p. 1 to 4.*

(Continued)

*Primary Examiner* — Shelly A Chase
(74) *Attorney, Agent, or Firm* — Oppedahl Patent Law Firm LLC

(57) ABSTRACT

A device and a method for optimally adjusting transmitter parameters are provided to optimize transmission performance of a digital signal system. The device comprises an error signal analyzing unit and a step length adjustment unit which are connected in signal with each other; the error signal analyzing unit analyzes an error signal and makes a determination to carry out a transmitter parameter adjustment operation; the step length adjustment unit calculates and determines an adjustment direction and an adjustment step length of the transmitter parameter; and a transmitter parameter adjusting unit carries out operations of direction adjustment and step length adjustment of the transmitter parameter according to the result of the determination.

10 Claims, 2 Drawing Sheets

FOREIGN PATENT DOCUMENTS

| | | | |
|---|---|---|---|
| CN | 1514560 | A | 7/2004 |
| CN | 1606256 | A | 4/2005 |
| CN | 1666449 | A | 9/2005 |
| CN | 101355404 | A | 1/2009 |
| CN | 101383659 | A | 3/2009 |
| EP | 1180854 | * | 2/2002 |
| EP | 1478104 | A1 | 11/2004 |
| EP | 1681820 | A1 | 7/2006 |
| JP | 2005295267 | A | 10/2005 |
| KR | 10200733115 | A | 3/2007 |
| WO | 0193463 | A2 | 12/2001 |

OTHER PUBLICATIONS

International Search Report in international application No. PCT/CN2009/073669, mailed on Dec. 3, 2009.

English Translation of the Written Opinion of the International Search Authority in international application No. PCT/CN2009/073669, mailed on Dec. 3, 2009.

Notification of the First Office Action of Chinese application No. 200810141853.1, issued on Jul. 13, 2010.

Supplementary European Search Report in European application No. 09811038.0, mailed on Dec. 6, 2011.

* cited by examiner

DEVICE AND METHOD FOR OPTIMALLY ADJUSTING TRANSMITTER PARAMETERS

TECHNICAL FIELD

The present invention relates to the technical field of signal transmission of digital communication systems, specifically to a device and a method for optimally adjusting transmitter parameters.

BACKGROUND

Generally, in a digital communication system, transmitter parameters, including an eye diagram crossing point of a transmitter, a driving amplitude, a Von (Voltage-On) level of an EA (electro absorption) modulated laser and the like, are important factors influencing the performance of the system.

Taking the eye diagram crossing point of a transmitter as an example, if the eye diagram crossing point of the transmitter is properly lowered, an average power of signals will be reduced as well. When the average power is invariant, the power of a code "1" signal with a lower eye diagram crossing point is higher than that of a code "1" signal with a higher eye diagram crossing point, that is, the code "1" signal with the lower eye diagram crossing point has a better noise resistant performance and is superior in signal-to-noise ratio (SNR for short) tolerance and receiving sensitivity. However, if the eye diagram crossing point is too low, the range of code "1" will be narrowed down and the redundancy space for the decision of the code "1" will be reduced, which may result in occurrence of an error in decision of the code "1" and an increase in bit error rate.

Taking the driving amplitude for another example, generally, the larger the driving amplitude is, the higher the extinction ratio is, and the higher the power ratio of "1" to "0" is, the better the noise resistant performance during transmission is and therefore the better the transmission performance is. However, if the driving amplitude is too large, the signal outputted from a drive will be distorted and degraded, and the transmission performance of the system will be consequentially degraded.

Likewise, as to the Von level of an EA modulated laser and various other adjustable parameters, there exists an optimal operating point which can optimize the transmission performance of a system. Therefore, a rational optimization for transmitter parameters is necessary in a digital communication system.

However, in existing systems, a transmitter parameter is not optimized but adjusted to a fixed empirical value, which generally cannot guarantee the set transmitter parameter being optimal.

No effective solution has been provided for transmitter parameter optimization in existing related technologies.

SUMMARY

In order to solve the problem that no effective solution for transmitter parameter optimization has been provided in related technologies, the present invention provides a device and a method for optimally adjusting transmitter parameters to solve at least one of the problems above.

is In order to achieve the purpose above, a device for optimally adjusting transmitter parameters is provided according to one aspect of the present invention.

The device for optimally adjusting transmitter parameters according to the present invention is used to optimize transmission performance of a digital signal system, and comprises an error signal analyzing unit and a step length adjustment unit which are connected in signal with each other. The error signal analyzing unit is used for analyzing an error signal and making a determination to carry out a transmitter parameter adjustment operation; and the step length adjustment unit is used for calculating and determining an adjustment direction and an adjustment step length of the transmitter parameter according to the analytical result of the error signal analyzing unit.

Preferably, the device may further comprise an error signal obtaining unit used for obtaining system transmission performance representation information as an error signal and transmitting the obtained error signal to the error signal analyzing unit.

Preferably, the error signal obtaining unit may be a forward error correction unit used for outputting error correction information as the error signal to detect and correct an error transmission code.

Preferably, the device may further comprise a transmitter parameter adjusting unit used for carrying out an automatic or manual adjustment of the transmitter parameter according to the adjustment direction and the adjustment step length transmitted from the step length adjustment unit.

According to another aspect of the present invention, a method for optimally adjusting transmitter parameters is provided.

The method for optimally adjusting transmitter parameters comprises the following steps:

Step A, an error signal analyzing unit analyzes an error signal and makes a determination to carry out a transmitter parameter adjusting operation;

Step B, a step length adjustment unit calculates and determines an adjustment direction and an adjustment step length of the transmitter parameter; and Step C, a transmitter parameter adjusting unit carries out operations of direction adjustment and step length adjustment of the transmitter parameter according to the result of the determination.

Preferably, in Step A, the operation of the error signal analyzing unit may specifically comprise:

Step A1, repeatedly initializing an initial value of the transmitter parameter;

Step A2, continuing Step A1 until neither loss of signal nor loss of frame occurs under the initial value; and Step A3, obtaining system transmission performance representation information as an error signal.

Preferably, in Step B, the operation of the step length adjustment unit may specifically comprise:

analyzing the error signal to obtain an adjustment direction of the transmitter parameter; and analyzing the error signal and calculating an adjustment step length of the transmitter parameter, or adopting a stored and predetermined adjustment step length.

Preferably, Step B may specifically comprise the following steps:

Step B1, the error correction information outputted by the forward error correction unit is subjected to a microprocessor to control an eye diagram crossing point adjusting unit of a transmitting device; and Step B2, the microprocessor which serves as the step length adjustment unit analyses and calculates the error correction information and outputs eye diagram crossing point adjustment information to the eye diagram crossing point adjusting unit.

Preferably, Step B2 may specifically comprise the following steps:

Step B21, an initial error signal under the initial value is compared with a single-step error signal under a value accumulated with a single step length; and Step B22, if the initial error signal exceeds the single-step error signal, accumulating a single step length, otherwise inversely accumulating a single step length.

Preferably, after Step C, the method may further comprise the following steps:

Step D1, after the transmitter parameter adjustment is completed once, re-obtaining an adjusted error signal;

Step D2, returning to Step B and starting a next transmitter parameter adjusting process; and Step D3, ending the adjustment when an error bit rate of the error signal is not greater than a set value.

According to the present invention, an error feedback mechanism is introduced and the operations of adjustment and feedback are alternately carried out, therefore, the problem that no solution has been provided for transmitter parameter optimization is solved; the transmitter parameter is optimized manually or automatically, so that the transmission performance of a digital communication system is guaranteed to be optimal, the setting precision of the transmitter parameter is improved, and performance indexes including system SNR and reception sensitivity are also improved.

BRIEF DESCRIPTION OF THE DRAWINGS

For the cases above, transmitter parameters can be optimized manually or automatically, so that the transmission performance of a digital communication system is guaranteed to be optimal.

DETAILED DESCRIPTION

Functional Overview

In order to solve the problems existing in the prior art, one embodiment of the present invention provides a solution for optimally adjusting transmitter parameters, which is based on the following processing principle of introducing an error feedback mechanism and alternatively conducting operations of adjustment and feedback to optimize the transmission performance of a digital communication system. In this solution, transmitter parameters are optimized automatically or manually, and the transmission performance of a digital communication system is guaranteed to be optimal.

Specific embodiments and examples of a device and a method for optimally adjusting transmitter parameters according to the present invention are illustrated below in detail in conjunction with the accompanying drawings.

Figure 1:
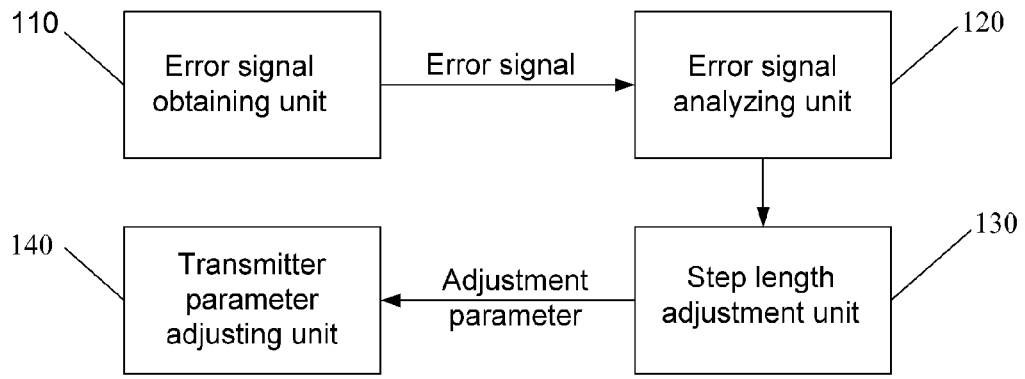
FIG. 1 is a schematic block diagram illustrating the structure of a device for optimally adjusting transmitter parameters according to one embodiment of the present invention.

FIG. 1 is a schematic block diagram illustrating the structure of a device for optimally adjusting transmitter parameters according to one embodiment of the present invention. As shown in FIG. 1, the device for optimally adjusting transmitter parameters according to one embodiment of the present invention comprises the following units:

an error signal obtaining unit 110 used for obtaining system transmission performance representation information as an error signal and transmitting the obtained error signal to an error signal analyzing unit 120;

an error signal analyzing unit 120 used for analyzing the information obtained by the error signal obtaining unit 110, determining whether an adjustment of transmitter parameters is needed; if an adjustment is needed, analyzing and determining an adjustment direction, and transmitting related information to a step length adjustment unit 130;

a step length adjustment unit 130 used for storing the predetermined adjustment step length of the transmitter parameters of a transmitting device, or used for calculating an adjustment step length of the transmitter parameters according to the result of the analysis conducted by the error signal analyzing unit 120; and used for transmitting the adjustment direction information determined by the error signal analyzing unit 120 to a transmitter parameter adjusting unit 140; and a transmitter parameter adjusting unit 140 used for carrying out an automatic or manual adjustment of the transmitter parameters of a transmitting device according to the adjustment direction and adjustment step length transmitted from the step length adjustment unit 130.

Figure 3:
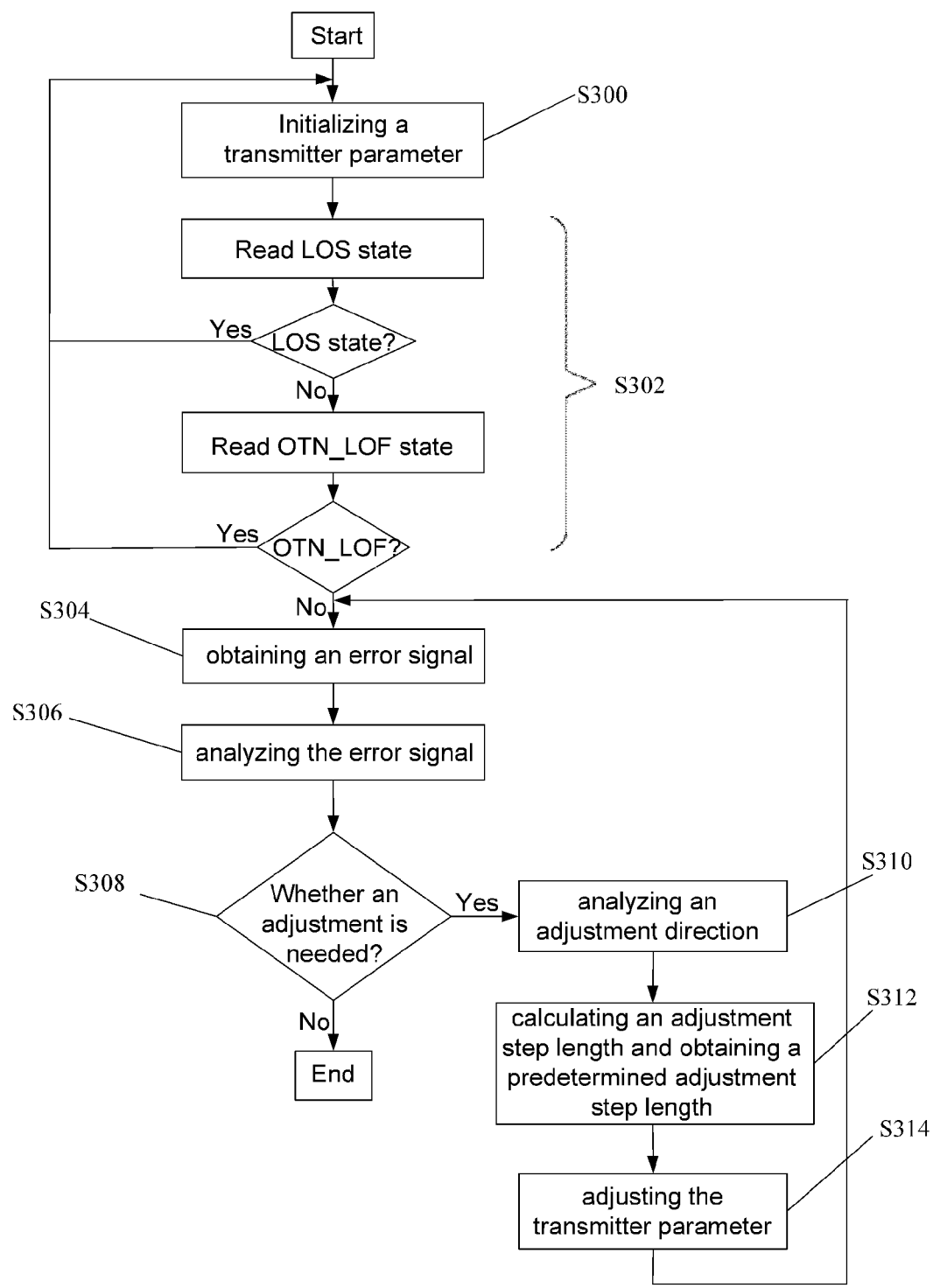
FIG. 3 is a schematic diagram illustrating the flow of a method for optimally adjusting is transmitter parameters according to one embodiment of the present invention.

FIG. 3 is a schematic diagram illustrating the flow of a method for optimally adjusting transmitter parameters according to one embodiment of the present invention. As shown in FIG. 3, the method for automatically optimizing and adjusting transmitter parameters according to one embodiment of the present invention comprises the following steps:

Step S300, initializing an initial value of a transmitter parameter, wherein the initial value may be a set empirical value;

Step S302, determining whether loss of signal (LOS for short) or loss of frame (LOF) occurs under the initial value, and when LOS or LOF occurs, returning to Step S300 and resetting the initial value until neither LOS nor LOF occurs.

Step S304, obtaining system transmission performance representation information as an error signal;

Step S306, conducting an error signal analysis on the system transmission performance representation information;

Step S308, determining whether the transmitter parameter needs to be adjusted; if no adjustment is needed, ending the optimization process, and if an adjustment is needed, conducting the processing of Step S310 on the transmitter parameter according to the result of the error signal analysis;

Step S310, obtaining an adjustment direction of the transmitter parameter according to the error signal analysis;

Step S312, calculating an adjustment step length of the transmitter parameter according to the error signal analysis, or adopting a stored predetermined adjustment step length; and Step S314, adjusting the transmitter parameter according to the result of the analysis in Step S310 and Step S312.

Returning to Step S304 after the transmitter parameter adjustment to re-obtain an adjusted error signal and start a next transmitter parameter adjusting process, and ending the adjustment operation when the bit error rate of the error signal is not greater than a set value or no adjustment is needed.

Figure 2:
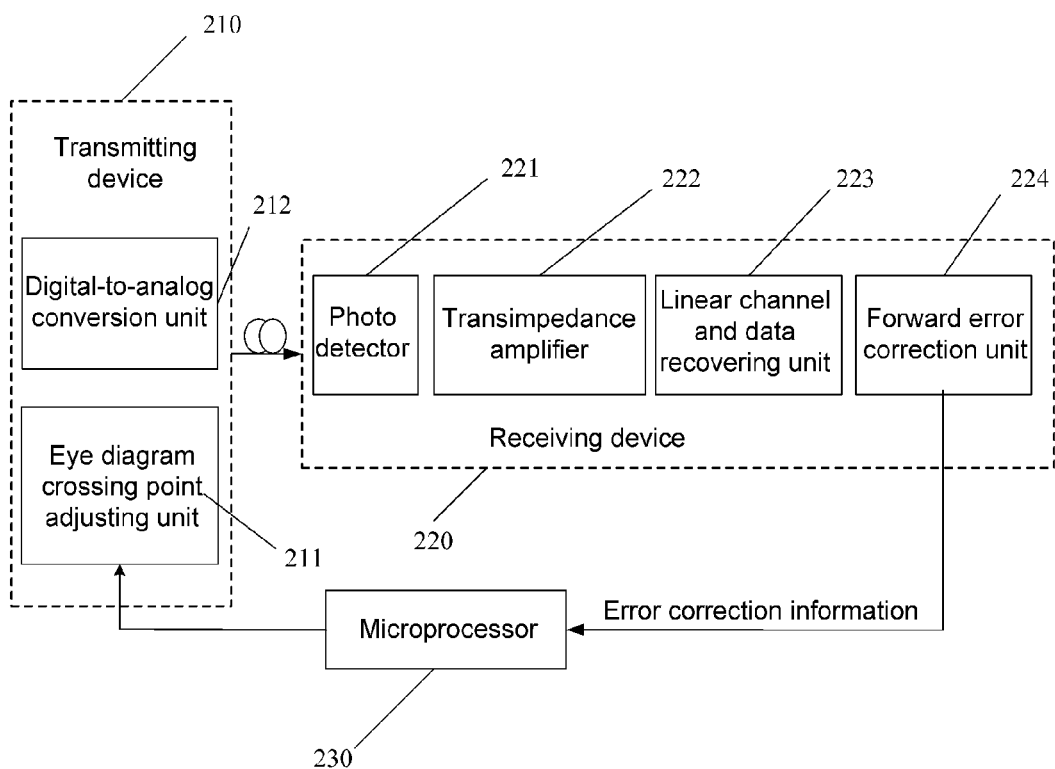
FIG. 2 is a schematic diagram illustrating the structure of a device for optimally adjusting transmitter parameters according to one embodiment of the present invention.

The device and the method for automatically and optimally adjusting transmitter parameters in a digital communication system of the present invention are further illustrated below with reference to a specific embodiment, and the automatic optimization process is described here still by taking the eye diagram crossing point of a transmitter as an example, as shown in FIG. 2. According to this embodiment, the device comprises three parts which are a transmitting device 210, a receiving device 220 and a microprocessor 230.

The microprocessor 230 is used for inquiring error correction information from a forward error correcting unit 224, conducting analysis and calculation, and controlling and adjusting an eye diagram crossing point of the transmitting device 210. The receiving device 220 comprises a photo detector 221, a transimpedance amplifier 222, a linear channel and data recovering unit 223 with automatic gain control function and the forward error correction unit 224. The transmitting device 210 comprises a digital-to-analog conversion unit 212 and an eye diagram crossing point adjusting unit 211, and is used for realizing an adjustment on the eye diagram crossing point of the transmitting device 210 and is equivalent to the transmitter parameter adjusting unit 140 shown in FIG. 1. The units above respectively function as follows:

the eye diagram crossing point adjusting unit 211 is used for receiving an adjustment signal from the microprocessor 230, carrying out a digital-to-analog conversion for the adjustment signal, and then controlling and adjusting the eye diagram crossing point of the transmitting device 210;

the photo detector 221, generally being a photo diode or avalanche photo diode, is used for conducting a conversion from an optical signal to an electric signal;

the transimpedance amplifier 222 is used for linearly amplifying a weak electric signal outputted by the photo detector 221 and comprises a conventional transimpedance amplifier and a voltage amplifier which converts a single-ended input signal to a differential input signal;

the linear channel and data recovering unit 223 comprises functional modules including a limiting amplifier with automatic gain control function, a filter, a data and clock recovery, a de-multiplexer and so on; and the forward error correction unit 224 is used for completing a forward error correction and reporting the error correction information to the microprocessor 230.

In order to achieve the object of optimal adjustment, the optical signal outputted from the transmitting device 210 is transmitted and inputted to the receiving device 220, the inputted optical signal is converted into a weak electric signal via the photo detector 221, then pre-amplified by the transimpedance amplifier 222, and amplified, filtered and recovered in data by the linear channel and data recovering unit 223, and finally inputted to the forward error correction unit 224 to detect and correct error codes in transmission.

Meanwhile, the error correction information outputted by the forward error correction unit 224 is subjected to a microprocessor 230 to control the eye diagram crossing point adjusting unit 211 of the transmitting device 210. In this embodiment, the error correction information outputted from the forward error correction unit 224 serves as the error information to conduct an optimal adjustment on the eye diagram crossing point, thus, the forward error correction unit 224 is equivalent to the error signal obtaining unit 110 shown in FIG. 1.

is The microprocessor 230 is used for analyzing and calculating the error correction information outputted from the forward error correction unit 224 and outputting eye diagram crossing point adjustment information to the eye diagram crossing point adjusting unit 211 of the transmitting device 210, thus, the microprocessor 230 is equivalent to the error signal analyzing unit 120 and the step length adjustment unit 130 shown in FIG. 1.

In a forward error correction system, the system signal error rate is the lowest and the transmission performance is optimal when the sum E of the numbers of corrected "1" and corrected "0" in the error correction information is minimum, thus, the sum E can be taken as one of the standards for determining whether an eye diagram crossing point adjustment is needed.

The minimum fixed step length is set to be h and the initialization setting of the eye diagram crossing point is X=a, then the sums E of error correction information are compared when a forward error correction system sets X=a and X=a+h, that is, the initial error signal under the initial value is compared with the single-step error signal under a value accumulated with a single step length; if the initial error signal exceeds the single-step error signal, namely, $E_{X=a} > E_{X=a+h}$, a single step length is accumulated namely X=a+h, otherwise a single step length is inversely accumulated namely X=a−h.

Then a new determination is made at a new position X, and when the sum E on the position of the current eye diagram crossing point is minimum or zero, the determination is ended and the optimal adjustment is considered completed.

Error cases such as LOS or LOF above are well known by those skilled in the art, so no more description is given here.

In the specific embodiments above, based on practical application, methods for optimizing other parameters of the transmitter can be various existing possible solutions that are well known by those skilled in the art, so no more description is given here.

According to an embodiment of the present invention, a computer-readable medium is also provided, on which computer-executable instructions are stored; when the instructions are executed by a computer or processor, the computer or processor is instructed to execute the processing of the steps shown in FIG. 3 and preferably one or more embodiments above.

In the device and method provided in the specific embodiments of the present invention for optimally adjusting transmitter parameters, as an error feedback mechanism is introduced and the operations of adjustment and feedback are alternatively conducted, the transmitter parameter is optimized automatically or manually, and consequently, the optimal transmission performance of a digital communication system is guaranteed, and the setting precision of the transmitter parameter as well as performance indexes including system SNR and reception sensitivity are improved.

It should be understood that improvements and variations can be made by those skilled in the art according to the explanation of the scheme above, for example, a variation to a transmitter parameter to be adjusted, and that all the improvements and variations are within the protection scope of the accompanying claims of the present invention.

What is claimed is:

1. A device for optimally adjusting transmitter parameters, which is used for optimizing transmission performance of a digital signal system, comprising a step length adjustment unit and an error signal analyzing unit which are connected in signal with each other;

the error signal analyzing unit being used for analyzing an error signal and making a determination to carry out a transmitter parameter adjusting operation; and the step length adjustment unit being used for calculating and determining an adjustment direction and an adjustment step length of the transmitter parameter according to the analytical result of the error signal analyzing unit.

2. The device according to claim 1, further comprising an error signal obtaining unit used for obtaining system transmission performance representation information as an error signal and transmitting the obtained error signal to the error signal analyzing unit.

3. The device according to claim 2, wherein the error signal obtaining unit is a forward error correction unit used for outputting error correction information as the error signal to detect and correct an error transmission code.

4. The device according to claim 3, further comprising a transmitter parameter adjusting unit used for carrying out an automatic or manual adjustment of the transmitter parameter according to the adjustment direction and adjustment step length transmitted from the step length adjustment unit.

5. A method for optimally adjusting a transmitter parameter, comprising:
Step A, an error signal analyzing unit analyzing an error signal and making a determination to carry out a transmitter parameter adjusting operation;
Step B, a step length adjustment unit calculating and determining an adjustment direction and an adjustment step length of the transmitter parameter; and
Step C, a transmitter parameter adjusting unit carrying out operations of direction adjustment and step length adjustment of the transmitter parameter according to the result of the determination.

6. The method according to claim 5, wherein in Step A, the operation of the error signal analyzing unit specifically comprises:
Step A1, repeatedly initializing an initial value of the transmitter parameter;
Step A2, continuing Step A1 until neither loss of signal nor loss of frame occurs under the initial value; and
Step A3, obtaining system transmission performance representation information as an error signal.

7. The method according to claim 6, wherein in Step B, the operation of the step length adjustment unit specifically comprises:
analyzing the error signal to obtain an adjustment direction of the transmitter parameter; and
analyzing the error signal and calculating an adjustment step length of the transmitter parameter, or adopting a stored predetermined adjustment step length.

8. The method according to claim 7, wherein Step B specifically comprises the following steps:
Step B1, the error correction information outputted by the forward error correction unit is subjected to a microprocessor to control the eye diagram crossing point adjusting unit of a transmitting device; and
Step B2, the microprocessor which serves as the step length adjustment unit analyses and calculates the error correction information and outputs eye diagram crossing point adjustment information to the eye diagram crossing point adjusting unit.

9. The method according to claim 8, wherein Step B2 specifically comprises the following steps:
Step B21, an initial error signal under the initial value is compared with a single-step error signal under a value accumulated with a single step length; and
Step B22, if the initial error signal exceeds the single-step error signal, accumulating a single step length, otherwise inversely accumulating a single step length.

10. The method according to claim 9, after Step C, further comprising:
Step D1, after the transmitter parameter adjustment is completed once, re-obtaining an adjusted error signal;
Step D2, returning to Step B and starting a next transmitter parameter adjusting process; and
Step D3, ending the adjustment when an error bit rate of the error signal is not greater than a set value.

* * * * *